(12) United States Patent
Andersson et al.

(10) Patent No.: US 11,619,367 B2
(45) Date of Patent: Apr. 4, 2023

(54) LIGHTING DEVICE FOR PROVIDING TRANSFORMABLE LIGHT

(71) Applicant: Volvo Car Corporation, Gothenburg (SE)

(72) Inventors: Markus Andersson, Gothenburg (SE); Stefan Langner, Henån (SE)

(73) Assignee: Volvo Car Corporation, Gothenburg (SE)

( * ) Notice: Subject to any disclaimer, the term of this patent is extended or adjusted under 35 U.S.C. 154(b) by 201 days.

(21) Appl. No.: 17/109,580

(22) Filed: Dec. 2, 2020

(65) Prior Publication Data

US 2021/0190296 A1    Jun. 24, 2021

(30) Foreign Application Priority Data

Dec. 18, 2019 (EP) ..................................... 19217595

(51) Int. Cl.
*F21V 14/06* (2006.01)
*H05B 47/115* (2020.01)
*F21W 106/00* (2018.01)

(52) U.S. Cl.
CPC ............ *F21V 14/06* (2013.01); *H05B 47/115* (2020.01); *F21W 2106/00* (2018.01)

(58) Field of Classification Search
None
See application file for complete search history.

(56) References Cited

U.S. PATENT DOCUMENTS

| | | | |
|---|---|---|---|
| 9,678,410 B2 | 6/2017 | Collias et al. | |
| 9,927,115 B2 | 3/2018 | Van Herpen et al. | |
| 2008/0002434 A1* | 1/2008 | Hsieh | G02B 6/0036 362/625 |
| 2008/0030650 A1* | 2/2008 | Kitagawa | G02B 6/0068 362/613 |

(Continued)

FOREIGN PATENT DOCUMENTS

| | | |
|---|---|---|
| DE | 2011014923 A1 | 9/2012 |
| DE | 102013206628 A1 | 10/2014 |

(Continued)

OTHER PUBLICATIONS

Mar. 27, 2020 European Search Report issued on International Application No. 19217595.

*Primary Examiner* — Elmito Breval
(74) *Attorney, Agent, or Firm* — Clements Bernard Walker; Christopher L. Bernard

(57) ABSTRACT

The disclosed subject matter generally relates to a lighting device including at least two optical output modules for jointly providing transformable output light. The transformable output light is transformable a diffuse light output and a light output that has higher contrast than the diffuse light. Accordingly, the inventors realized that an enhanced user experience for vehicle occupants is provided by a lighting device that can seamlessly transform its output light between diffuse light to more high contrast light. For example, a vehicle interior component may be illuminated with a diffuse light when it is in one state, e.g. when it is not used. In a second state, when the component is used or intended to be used, it may be illuminated with a high contrast light to provide the user with more helpful assist light.

15 Claims, 9 Drawing Sheets

(56) References Cited

U.S. PATENT DOCUMENTS

| | | | |
|---|---|---|---|
| 2011/0227895 A1* | 9/2011 | Takahashi | G02B 6/0061 |
| | | | 362/613 |
| 2012/0075326 A1* | 3/2012 | Tsuchiya | G02B 6/0058 |
| | | | 345/589 |
| 2014/0140088 A1 | 5/2014 | Griebel | |
| 2015/0092434 A1* | 4/2015 | Satake | F21S 43/249 |
| | | | 362/511 |
| 2017/0131459 A1 | 5/2017 | Yamaguchi et al. | |
| 2017/0240105 A1 | 8/2017 | LeCorre et al. | |
| 2018/0020524 A1 | 1/2018 | Tylicki et al. | |
| 2018/0281675 A1 | 10/2018 | Tassy et al. | |
| 2019/0299846 A1 | 10/2019 | Chingyo et al. | |

FOREIGN PATENT DOCUMENTS

| | | |
|---|---|---|
| EP | 3096078 A1 | 11/2016 |
| WO | 03055273 A2 | 7/2003 |
| WO | 2005007450 A1 | 1/2005 |
| WO | 2016058654 A1 | 4/2016 |
| WO | 2016208388 A1 | 12/2016 |

\* cited by examiner

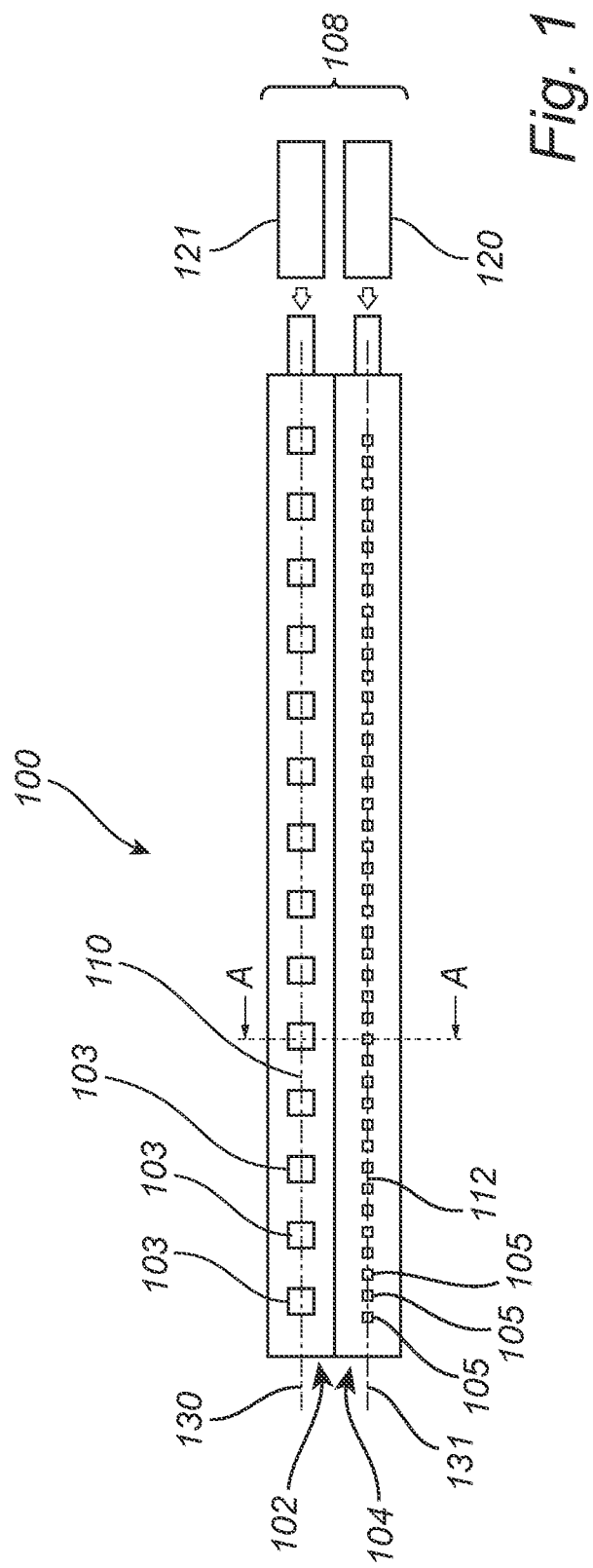

LIGHTING DEVICE FOR PROVIDING TRANSFORMABLE LIGHT

CROSS-REFERENCE TO RELATED APPLICATION

The present disclosure claims the benefit of priority of co-pending European Patent Application No. 19217595.8, filed on Dec. 18, 2019, and entitled "AN IMPROVED LIGHTING DEVICE FOR PROVIDING TRANSFORMABLE LIGHT," the contents of which are incorporated in full by reference herein.

TECHNICAL FIELD

The present disclosure generally relates to a lighting device for providing transformable output light. The present disclosure further relates to a lighting assembly, a lighting system, and to a computer program product.

BACKGROUND

For a long time has vehicle interiors been equipped with various lighting devices. For example, it is often the case that the vehicle interior is illuminated as the vehicle doors are opened, and subsequently the illumination is turned off when the vehicle doors are closed. This type of vehicle interior lighting assists the user in being able visually inspect the vehicle interior, i.e. to find items or secure the seat belt. Another example of interior lighting are lamps in the glove compartment which provide illumination as the glove compartment is opened.

Vehicle interiors are often equipped with infotainment systems and other instrumentations that are becoming more advanced as the automotive industry evolves. Thus, it appears that much attention had been paid to developing e.g. infotainment systems significantly. However, it appears that the illumination functionality has fallen behind in the development.

Although the previously employed vehicle interior lighting provides the vehicle occupants with helpful assist, there is room for improvement. For example, the interior illumination experience may be enhanced by providing the user with a more dynamic experience that at the same time improves the assist perspective of interior illumination.

SUMMARY

The disclosed subject matter generally relates to a lighting device including at least two optical output modules for jointly providing transformable output light. The transformable output light is transformable between a diffuse light output and a light output that has higher contrast than the diffuse light.

Accordingly, the inventors realized that an enhanced user experience for vehicle occupants is provided by a lighting device that can seamlessly transform its output light between diffuse light to more high contrast light. For example, a vehicle interior component may be illuminated with a diffuse light when it is in one state, e.g. when it is not used. In a second state, when the component is used or intended to be used, it may be illuminated with a high contrast light to provide the user with more helpful assist light.

The above advantages are provided by a lighting device including at least two optical output modules for jointly providing transformable output light. A first optical output module includes optical elements configured to redirect incoming light to produce diffuse light and a second optical output module includes optical elements configured to redirect incoming light to produce light with higher contrast than the diffuse light produced by the first optical output module. Further, the first optical output module and the second optical output module are arranged to receive incoming light from a light source assembly in such a way that when the first optical output module receives incoming light of one of increasing and decreasing intensity, the second optical output module receives incoming light of the other one of increasing and decreasing intensity such that the contrast of the output light from the lighting device is transformed.

In one advantageous embodiment, the lighting device may be responsive to transform the output light based on a detected user scenario. The lighting device may be able to classify input data related to a state of the vehicle and/or the usage behavior sensed via sensors, to a user scenario. A detected user scenario may cause the lighting device to transform the output light. This embodiment advantageously provides for a further enhanced dynamic lighting experience for occupants of the vehicle. For example, the lighting may be transformed automatically to adapt to an altered user scenario.

The transformation of the output light is preferably gradual, e.g. continuous, seamless.

Further features of, and advantages with, the embodiments of the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF DRAWINGS

These and other aspects of the present invention will now be described in more detail, with reference to the appended drawings showing example embodiments of the invention, wherein:

FIG. 1 is a conceptual view of a lighting device according to embodiments of the present disclosure;

DETAILED DESCRIPTION

Figure 2A:
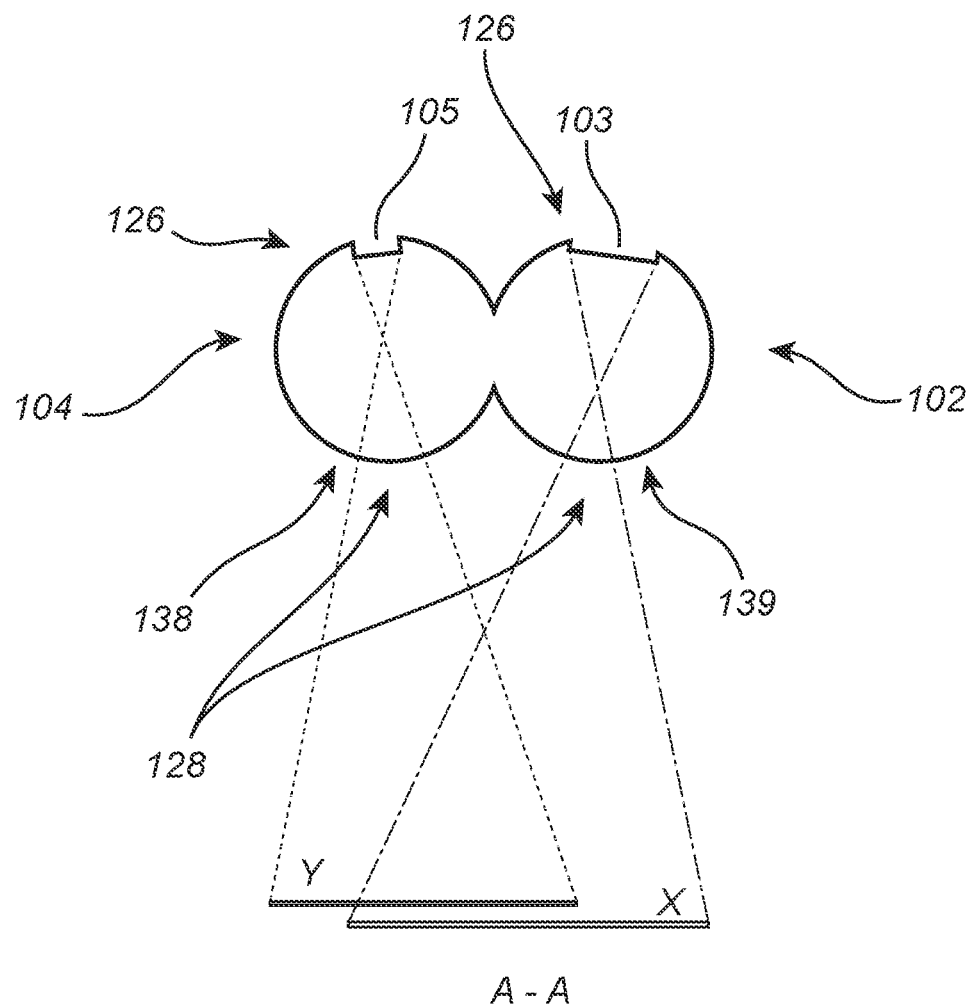
FIG. 2A is a cross-sectional view of a lighting device according to embodiments of the present disclosure.

In the present detailed description, various embodiments of a lighting device and a light source assembly according to the present disclosure are described. However, the lighting device and a light source assembly may be embodied in many different forms and should not be construed as limited to the embodiments set forth herein; rather, these embodiments are provided for thoroughness and completeness, and to fully convey the scope of the present disclosure to the skilled person. Like reference characters refer to like elements throughout.

FIG. 1 is a conceptual view of a lighting device 100 according to embodiments of the present disclosure. The lighting device 100 includes at least two optical output modules 102 and 104 for jointly providing transformable output light. A first optical output module 102 includes optical elements 103 (not all are numbered) configured to redirect incoming light to produce diffuse light and a second optical output module 104 includes optical elements 105 (not all are numbered) configured to redirect incoming light to produce light with higher contrast than the diffuse light produced by the first optical output module. The first optical output module 102 and the second optical output module 104 are arranged to receive incoming light from a light source assembly 108 in such a way that when the first optical output module 102 receives incoming light of one of increasing and decreasing intensity, the second optical output module 104 receives incoming light of the other one of increasing and decreasing intensity such that the contrast of the output light from the lighting device is transformed.

The first optical output module 102 and the second optical output module 104 are configured to receive light from a light source assembly 108 and transform the light to the respective one of a diffuse light and a higher contrast light. Accordingly, the optical elements 103 of the first optical output module are differently configured compared to the optical elements 105 of the second optical output module.

In contrast, the optical elements 103 of the first optical output module 102 may be adapted to scatter the light received from the light source assembly 108, such that the output light emitted from the first optical output module 102 has a diffuse appearance, e.g. with no visually sharp edges. Thus, the optical elements 103 of the first optical output module 102 may be adapted to spread the light beams received from the light source assembly 108.

The optical elements 105 of the second optical output module 104 may be adapted to focus the light received from the light source assembly 108, such that the output light emitted from the second optical output module 104 has a high contrast appearance, e.g. with sharp outer edges. Thus, the optical elements 105 of the second optical output module 104 may be adapted to collect the light beams received from the light source assembly 108.

The optical elements may be arranged in an array, as is conceptually illustrated in FIG. 1. Preferably, the optical elements may be arranged in a one-dimensional array with substantially equal spacing between the optical elements to in this way provide a uniform light output. In FIG. 1, the optical elements 103 are arranged in a one-dimensional array with spacing 110 between neighbouring optical elements 103, and the optical elements 105 are arranged in a one-dimensional array with spacing 112 between neighbouring optical elements 105.

The first optical output module 102 and the second optical output module 104 receives light with oppositely and at least partly simultaneously altering intensity. In this way, the output light that illuminates a surface of interest, is transformed, e.g. changed or varied, from a diffuse appearance to a higher contrast appearance, or from a higher contrast appearance to a diffuse appearance in a seamless continuous manner.

The inventors thus realized a way to provide a unique experience for vehicle occupants while at the same time providing an improved assisting light in a vehicle. For example, in situations when a vehicle interior component is not used, the illumination may be set to a diffuse light output. When the vehicle interior component is used, the illumination of the component may be transformed to a high contrast light output to thereby provide more focused assisting light for the user. As another example, when the vehicle is travelling, an interior illumination may be set to a diffuse light output. When the vehicle stops, the interior illumination may be transformed to a high contrast light output.

With further reference to FIG. 1, the light source assembly 108 is configured to transmit light to the lighting device 100 including at least two optical output modules 102, 104. A first optical output module includes optical elements configured to emit diffuse light and a second optical output module configured to emit light with higher contrast than the diffuse light emitted from the first optical output module. The light source assembly 108 is responsive to a control signal to transmit light of one of increasing and decreasing intensity to the first optical output module 102, and to transmit light of the other one of increasing and decreasing intensity to the second optical output module 104.

The light source assembly 108 may include a first light source 120 and a second light source 121. In this way, the first light source 120 may be arranged to transmit light towards the first optical output module 102 and the second light source 121 may be arranged to transmit light towards the second optical output module 104.

Preferably, when the first optical output module 102 receives incoming light of one of increasing and decreasing intensity, the second optical output module 104 simultaneously receives incoming light of the other one of increasing and decreasing intensity. In other words, the first light source alters 120 and the second light source 121 alter their light output intensity simultaneously.

Further, in embodiments, the control signal may be generated in response to a detected user scenario. Thus, in embodiments, the lighting device is responsive to transform the output light based on a detected user scenario.

A user scenario may be defined by a detected action performed by a user, or by a state of the vehicle employing the lighting device 100. For example, a detector in the vehicle interior may detect that the user is reaching towards a door stowage or glove compartment, whereby a lighting device according to embodiments of the present disclosure transforms the light illuminating the door stowage or glove compartment from a diffuse light to a high contrast light to provide more efficient assisting light for the user. As a further example, the control signal may be indicative of that the vehicle is travelling, wherein the light device is responsive to transform the vehicle interior illumination from high contrast to diffuse.

A further example user scenario may be the presence or no presence of vehicle occupants in certain zones of the vehicle. For example, if there are no occupants in one of the seats than the illumination in the vicinity of that seat may be transformed to e.g. diffuse and low intensity.

Accordingly, the user scenario is based on detected usage or intended usage of vehicle interior components or based on the present state of the vehicle to also define a user scenario. Further example user scenarios will be described with reference to FIG. 7A-8B.

The intensity of the light provided to the second optical output module 104 may be lower than the intensity of the light provided to the first optical output module 102. Alternatively, the intensity of the light provided to the first optical output module 102 may be lower than the intensity of light provided to the second optical output module 104. Accordingly, the light output may for example be transformed from high contrast and high intensity to diffuse and low intensity. With different intensities, a further enhanced user experience is provided, and a more efficient assisting light may be provided compared to the background diffuse illumination that may be provided with lower intensity.

FIG. 2A illustrates a cross-section of the lighting device 100 in FIG. 1. In the cross-section there is shown a first optical output module 102 and a second optical output module 104 arranged side-by-side. The first optical output module 102 and the second optical output module 104 is a respective light guide. The optical elements 103 and 105 included in the respective light guide are arranged to redirect incoming light through a respective light guide 102, 104. Thus, the optical elements 103, 105 receive light from the light source assembly 108 shown in FIG. 1, and subsequently redirect light through the respective light guide 102, 104. The first optical element 103 is arranged to emit light through a first light guide 102 and the second optical element 105 is arranged to emit light through a second light guide 104. The light emitted from the optical elements 103, 105 are transmitted from one side 126 of the light guides 102, 104, through the material of the respective light guide 102, 104, and are output from the opposite side 128 of the respective light guide.

As is better seen in FIG. 1, the optical elements 103 and 105 may be arranged side by side along the respective light guide 102 and 104 to provide a substantially homogenous light output from the respective light guide 102 and 104. The light guides 102, 104 are elongated along a longitudinal axis 130, 131 and arranged side by side. That the light guides are elongated means that one of the outer dimensions of the light guide portions is substantially larger than the other outer dimensions. The light guide portions may be attached to each other and oriented in parallel with each other. This provides for the light output, whether it is high contrast or diffuse, to appear to be emitted from nearly the same location. The light guides may be solid, e.g. not being hollow.

Figure 5B:
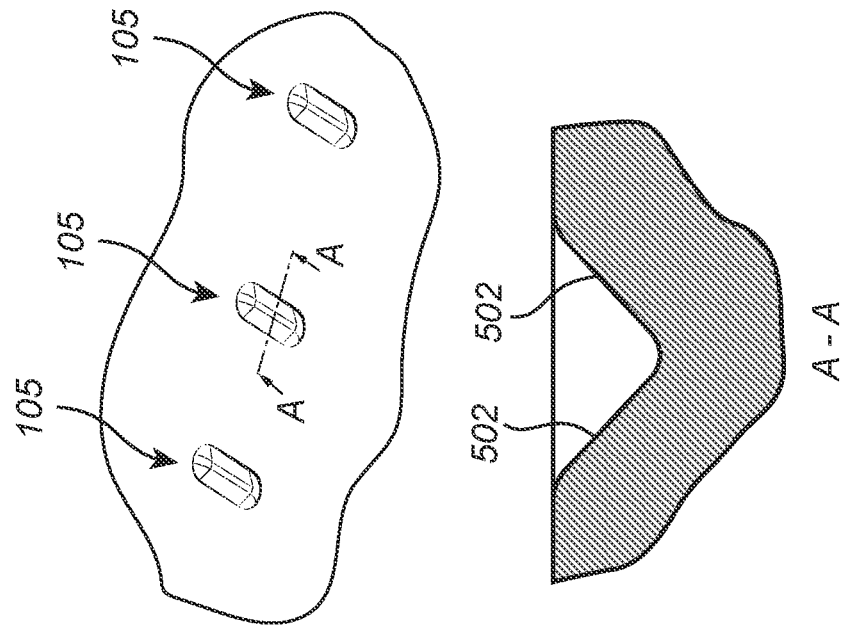
FIG. 5B schematically illustrates a second type of prism according to embodiments of the present disclosure.
Figure 5A:
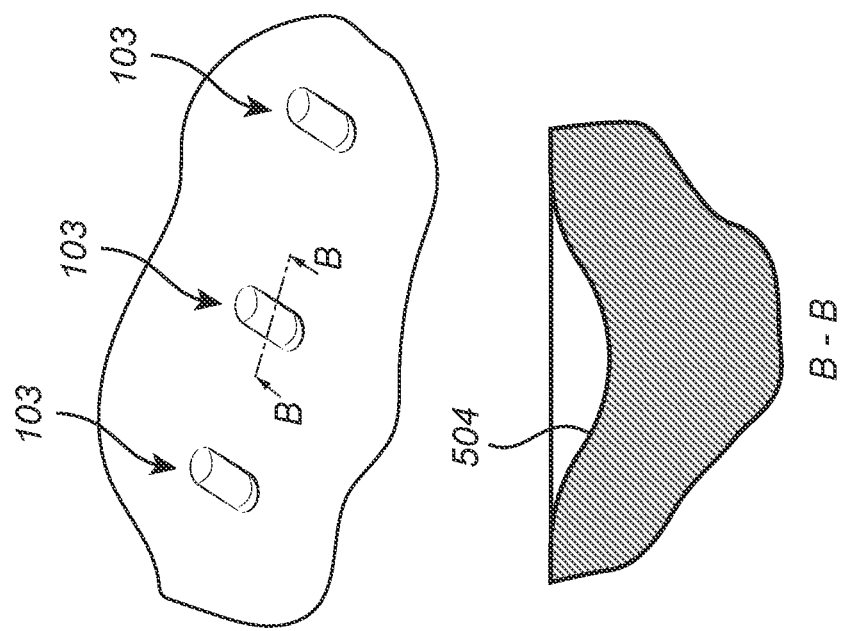
FIG. 5A schematically illustrates a first type of prism according to embodiments of the present disclosure.

Turning again to FIG. 2A, the optical elements 103, and 105 are here shown as a respective cavity. The cavities may be formed directly in the light guides 102 and 104. The specific shape of the optical elements may be adapted to the specific implementation and is here only conceptually shown. Other example cavities are shown in FIGS. 5A-B.

The light guides 102 and 104 have an at least partly curved cross-section in a plane perpendicular to the longitudinal axis 130, 131. This provides for a better spread of the light illuminated from the light guides 102 and 104. Thus, the curved outer surface 138, 139 of the light guides 102 and 104 provides for a larger area that can be illuminated.

The first light guide 102 including the optical elements 103 are configured to provide the light output picture X. The second light guide 104 including the optical elements 105 are configured to provide the light output picture Y. The light output picture Y provided by the second light guide 104 at least partly overlaps with the light output picture X provided by the first light guide 102. In this way, the diffuse light picture provided by the first light guide 102 illuminates at least partly the same area as the area illuminated by the second light guide 104.

The light guides 102 and 104 may be made from an optically transparent material such as a polymer or glass, or plastic materials. The light guides are adapted to distribute light from the light source to provide a respective output picture X, Y, on a receiving surface. The material of the light guides has refractive index that allows for internal reflections of light inside the light guide, form the light source, to the optical elements 103, 105, and out through the curved surfaces 138, 139.

Figure 2B:
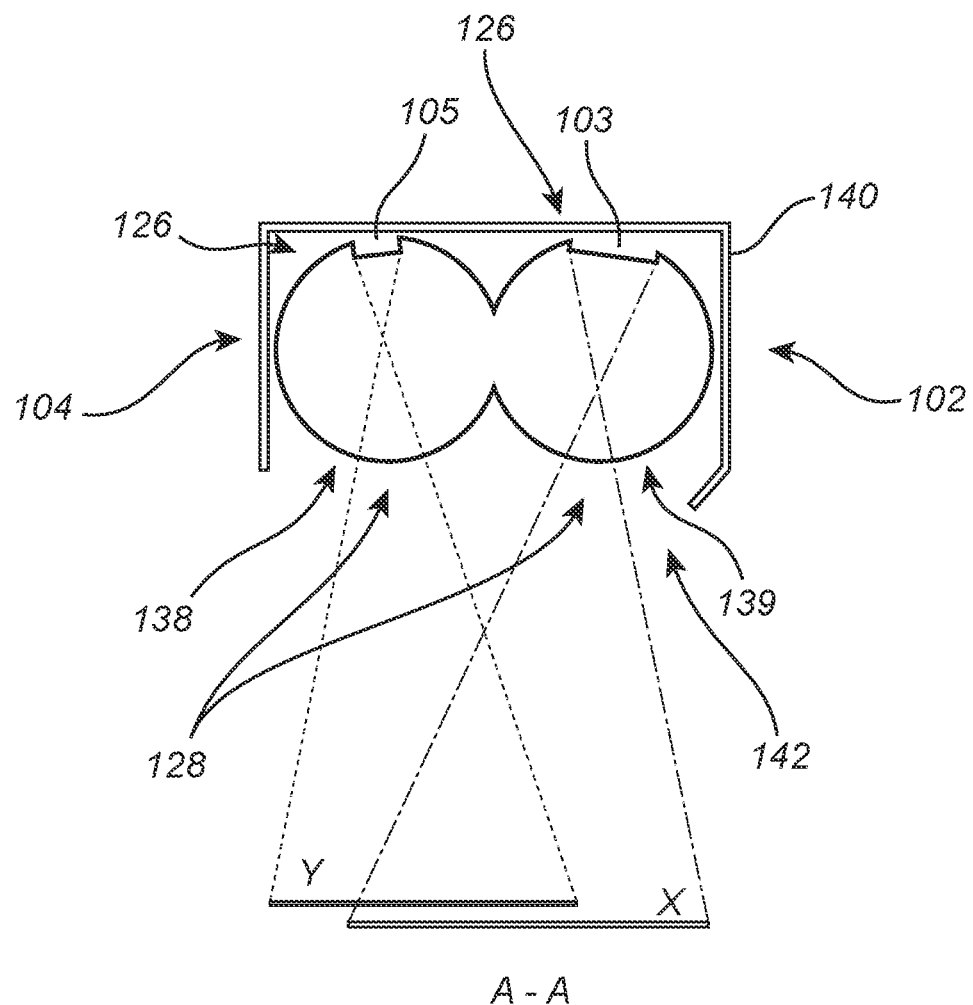
FIG. 2B is a cross-sectional view of a lighting device according to embodiments of the present disclosure

Preferably, as illustrated in FIG. 2B, the lighting device 100 includes a carrier 140 that is attachable to the first and second optical output module 102, 104. The carrier 140 serves as housing for the first and second optical output module 102, 104. Further, the carrier 140 has an opening 142 through which light emitted from the first and second optical output module 102, 104 may reach outside the carrier 140 and be emitted towards an intended surface to illuminate. Furthermore, the carrier 140 is further configured to block light in selected directions. Thus, the carrier 140, through its opening 142 is adapted to allow light to be emitted only in selected directions as determined by the opening 142.

The first and second optical output module 102, 104 may be attached to the carrier 140 by various means such as e.g. clips, screws, adhesives.

Figure 3A:
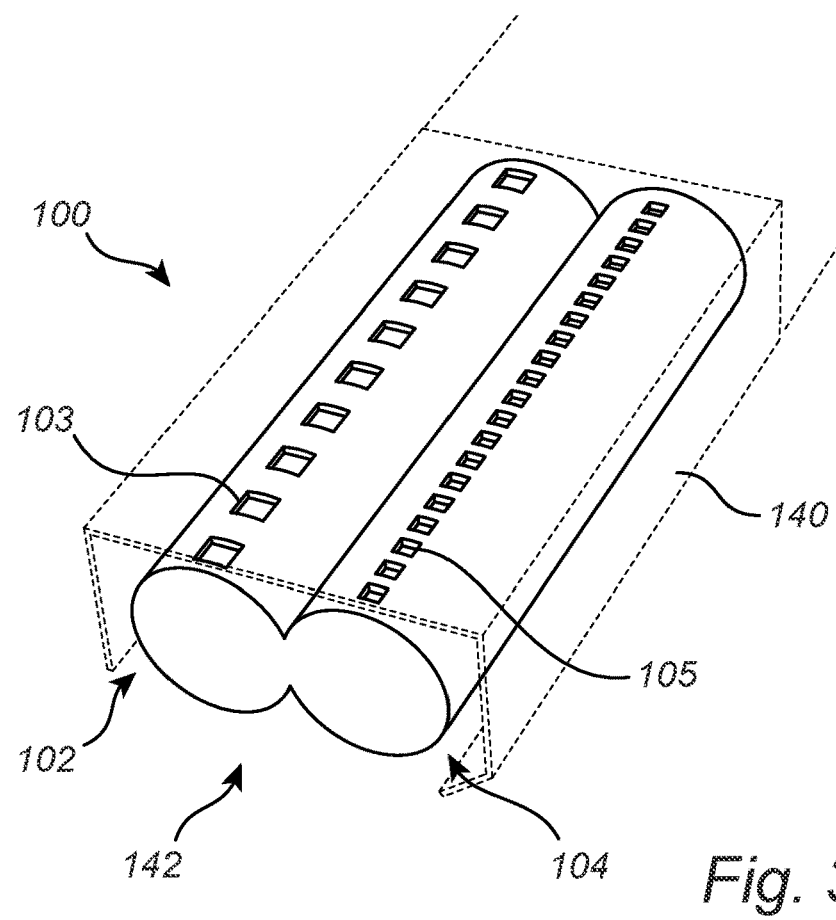
FIG. 3A is a perspective view of a lighting device according to embodiments of the present disclosure.

FIG. 3A is a conceptual perspective view of a lighting device 100 including straight cylindrical first and second optical output modules 102, 104. The first and second optical output modules 102, 104 includes a respective array of optical elements 103, and 105. In addition, the lighting device 100 includes a carrier 140 adapted to accommodate the first and second optical output modules 102, 104. The carrier is made from an optically opaque material and has an opening 142 through which light from the first and second optical output modules 102, 104 may be emitted.

Figure 3B:
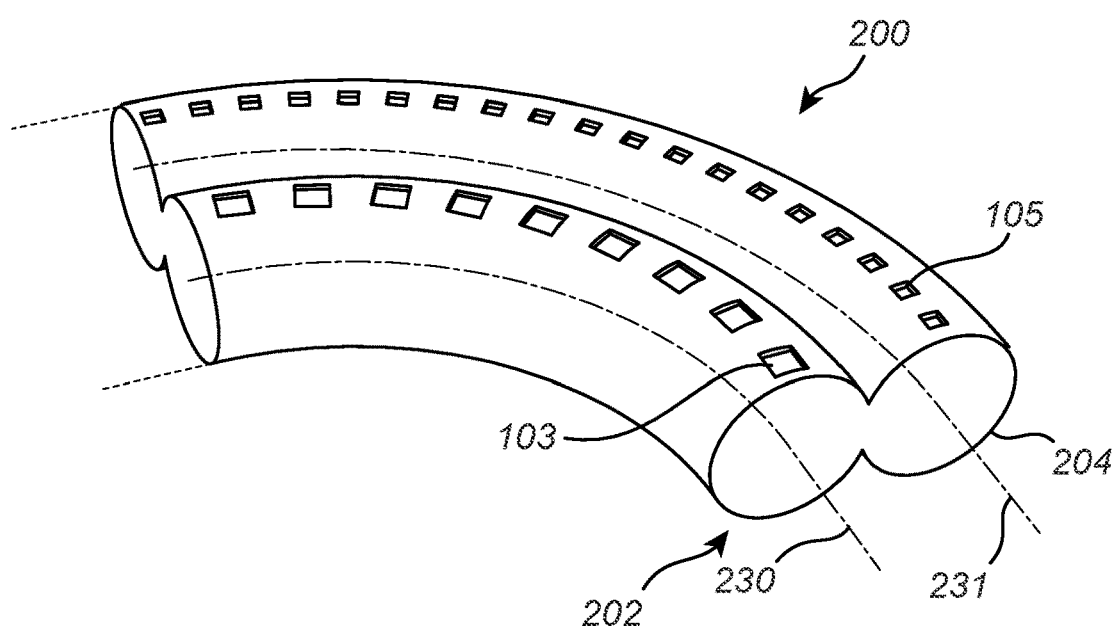
FIG. 3B is a perspective view of a lighting device according to embodiments of the present disclosure.

FIG. 3B illustrates an alterative embodiment of a lighting device 200, including first and second optical output modules 202, 204 including a respective array of optical elements 103, and 105. The first and second optical output modules 202, 204 are curved, in contrast to the straight shape illustrated in FIG. 3A. In FIG. 3B, the optical output modules 202, 204 are elongated along a curved path 230, 231 and arranged side by side. The carrier 140 is omitted in FIG. 3B but may of course be included and adapted accordingly also when the optical output modules are curved.

It is understood that the optical output modules 102, 104 may extend along various curved or straight paths, or combinations thereof, and are not limited to the herein disclosed examples.

Figure 4A:
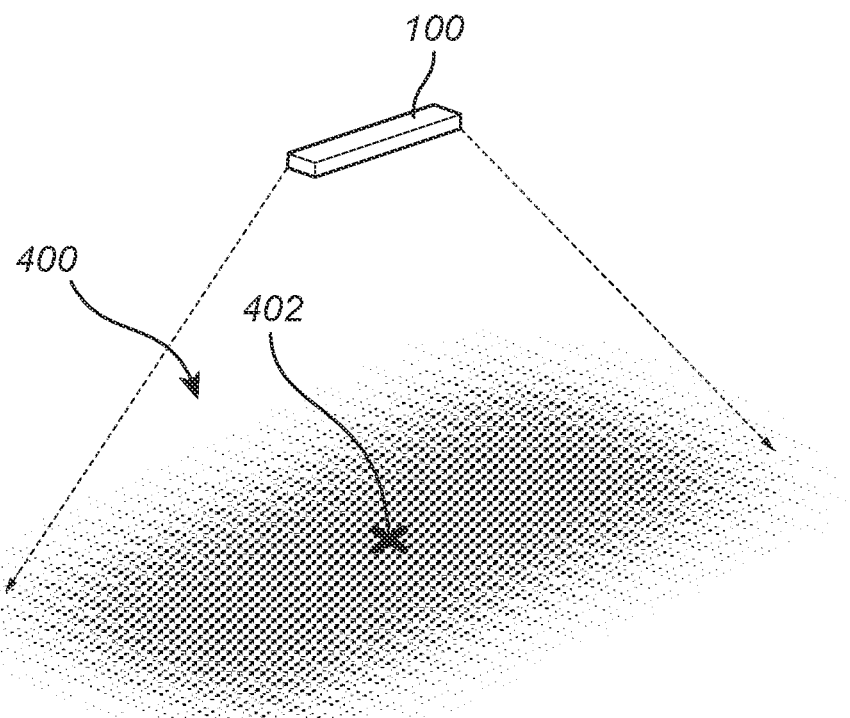
FIG. 4A conceptually illustrates a diffuse light output.
Figure 4B:
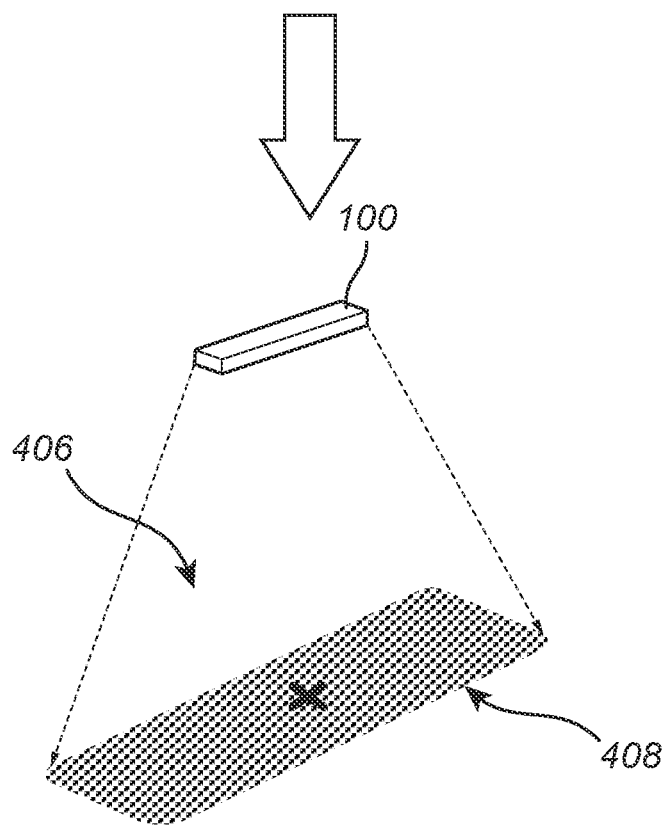
FIG. 4B conceptually illustrates a high contrast light output.

FIG. 4A-B conceptually illustrates the output light emitted by the lighting device 100, transforming between diffuse light and high contrast light. Starting from FIG. 4A there is shown the output light picture 400 of an example diffuse light. This output light picture 400 may be provided when the light received by the first optical output module 102 has substantially higher intensity than the intensity of light received by the second optical output module 104. The output light picture 400 has no sharp edges, instead, the intensity of the light output continuously becomes weaker further from the center 402 of the light picture 400.

Turning now to FIG. 4B, the output light picture 400 in FIG. 4A has transformed to the higher contrast light output picture 406. This output light picture 406 may be provided when the light received by the second optical output module 104 has substantially higher intensity than the intensity of light received by the first optical output module 102. The output light picture 406 has sharp edges 408, and the intensity of the light output 406 is substantially homogenous. The intensity of the light output picture 406 with the high contrast may be decreased abruptly to zero at the edges 408 of the light output picture 406.

In embodiments, the increase or decrease in intensity is a gradual/continuous increase or decrease. Accordingly, a smooth transformation of the light output picture is preferred to provide an enhanced user experience. The increase or decrease in intensity may be linear with respect to time. Further, the rate of change in the increase in intensity of light provided to one of the optical assemblies may be substantially equal to the rate of change in the decrease in intensity of light provided to the other one of the optical assemblies.

The optical elements 103, 105 may be optical prisms. Optical prisms provide a relatively manufacturing efficient way to provide the herein desired optical outputs. The set of prisms 103 of the first optical output module 102 are different from the set of prisms 105 of the second optical output module 104. In this way may the high contrast light output be provided by the prisms of the second optical output module while the diffuse light output may be provided by the prisms of the first optical output module.

FIG. 5A conceptually illustrates the outlines of a first type of prism 103 adapted to provide a providing diffuse light. FIG. 5B conceptually illustrates the outlines of a second type of prism 105 adapted to provide a higher contrast light. A prism 105, conceptually illustrated in FIG. 5B, for high contrast light output may have planar surfaces 502 and e.g. a pointier appearance than a prism 103 for providing diffuse light, as illustrated in FIG. 5A conceptually illustrating a prism 103. The surface 504 forming the cavity of the first type of prism 103 are generally closer to planar than the surfaces 502 forming the cavity of the second type of prism 105 adapted to provide high contrast light. The surface 504 of the first type of prism 103 may be rounded or curved to better spread the incoming light to thereby provide a diffuse output light from the light guide that the prisms 105 are included in. A rounded or curved surface 504 spreads the light more than a planar surface 502 which generally collects the incoming light into a clear light picture 406.

Figure 6:
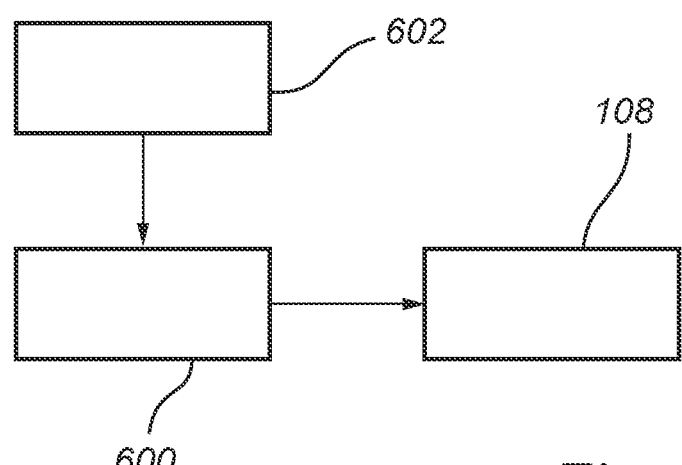
FIG. 6 is box diagram of a control unit configured to control a light source assembly according to embodiments of the present disclosure.

FIG. 6 is box diagram of a control unit 600 configured to control a light source assembly 108 configured to transmit light to a lighting device including at least two optical output modules. A first optical output module includes optical elements configured to redirect incoming light to produce diffuse light and a second optical output module configured to redirect incoming light to produce light with higher contrast than the diffuse light emitted from the first optical output module. The control unit 600 is configured to control the light source assembly 108 to transmit light of one of increasing and decreasing intensity to the first optical output module, and to transmit light of the other one of increasing and decreasing intensity to the second optical output module.

The control unit may be configured to control the light source assembly in response to a detected user scenario. The control unit may be communicatively connected to detectors 602 arranged to detected user scenarios. The detectors may be configured to provide electronics control signals indicative of the detected user scenarios to the control unit 600.

Figure 7A:
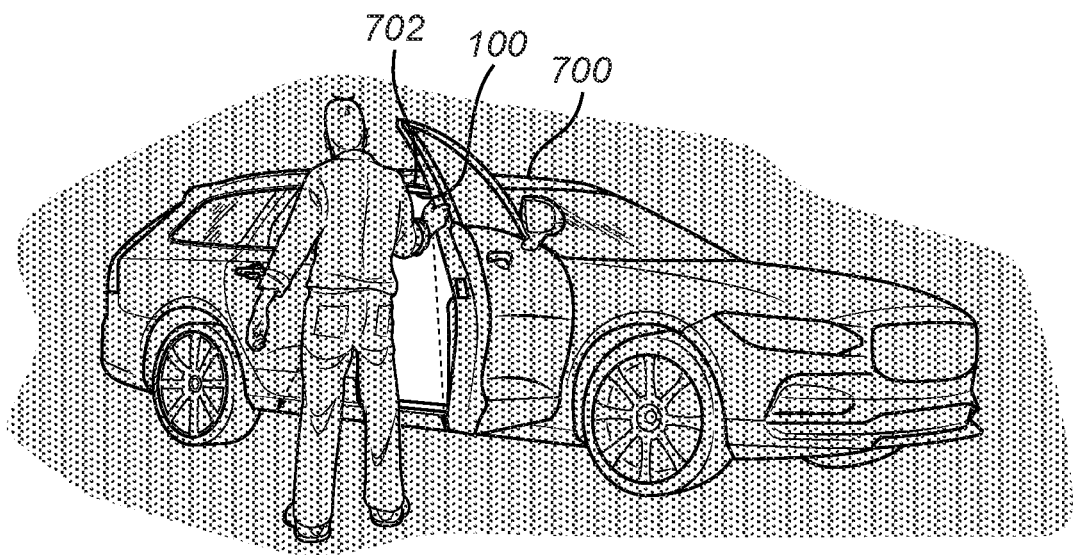
FIG. 7A-B conceptually illustrates example user scenarios according to embodiments of the present disclosure.
Figure 7B:
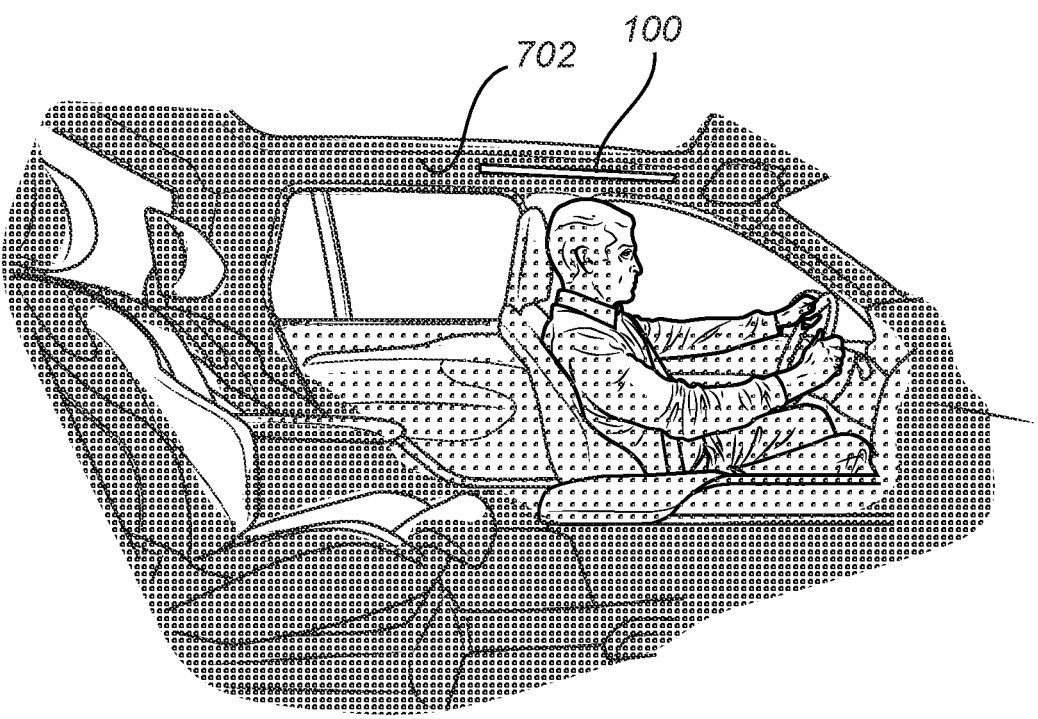

FIG. 7A-B conceptually illustrates a user scenario. In FIG. 7A, the vehicle user has unlocked the vehicle 700 and opened the vehicle door. In this scenario, the lighting device 100 arranged in the vehicle interior ceiling 702 provides a high contrast light picture inside the vehicle. In this way, the user is provided with assisting light to assist the user to in a safe way enter the vehicle 700. The control unit 600 shown in FIG. 6 has thus received a signal from a vehicle subsystem that the vehicle door is open, whereby the control unit controls a light assembly to provide higher intensity light to the second optical output module than to the first optical output module such that higher contrast light output picture is provided.

Once the user controls the vehicle to travel, i.e. to move forward or backwards, as illustrated in FIG. 7B where the vehicle is moving forward, the control unit controls the optical output module to be higher intensity light to the first optical output module than to the second optical output module to thereby transform the light output to a diffuse light output picture. Thus, a less sharp light output, which may be experienced as more comfortable, is provided inside the vehicle. When the vehicle stops, the lighting device 100 transforms the light to the higher contrast light again. Preferably, the intensity of the output light is higher when providing the higher contrast light output compared to the intensity of the output light when providing the diffuse light output.

The length of the lighting device 100 is here shown for illustrative purposes and may be longer or short than in the depicted embodiment. For example, the may be one lighting device 100 above each vehicle door, or there may be a single lighting device that reaches across two neighbouring vehicle doors. Further, a light source assembly may be arranged in the vicinity of the lighting device 100, such as included in a lighting system of the present disclosure. The light source assembly may alternatively be arranged elsewhere in the vehicle in which case the light is guided to the lighting device 100 by e.g. optical fibres or other optical guiding means.

Figure 8A:
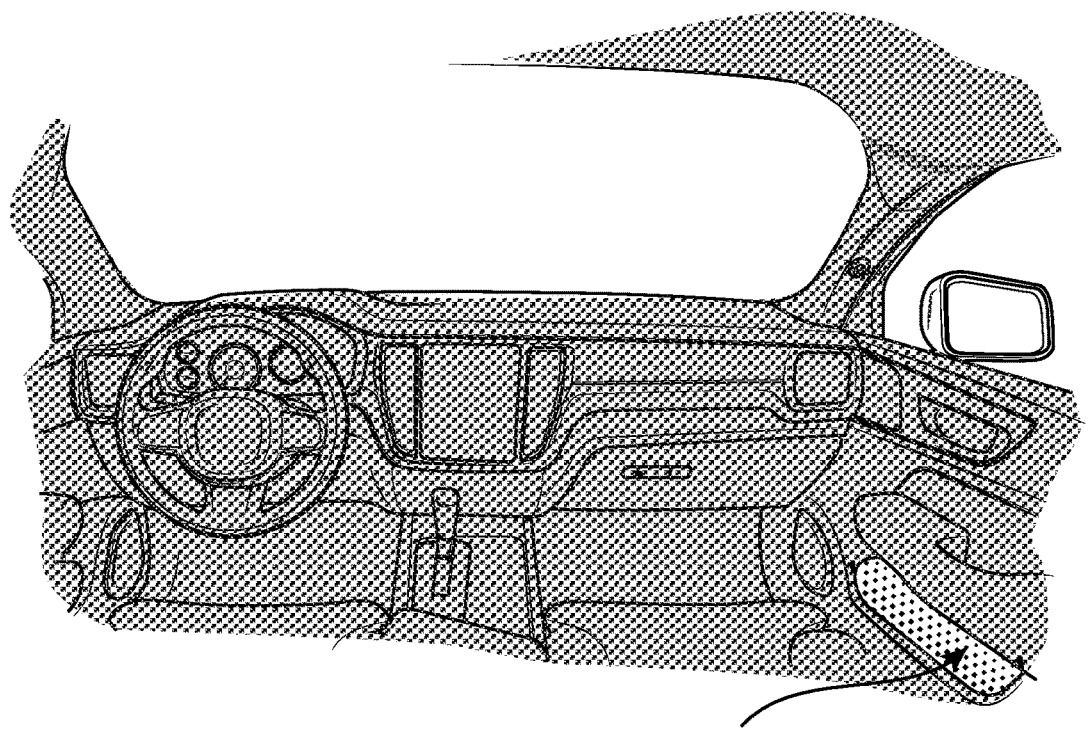
FIG. 8A-B conceptually illustrates example user scenarios according to embodiments of the present disclosure.
Figure 8B:
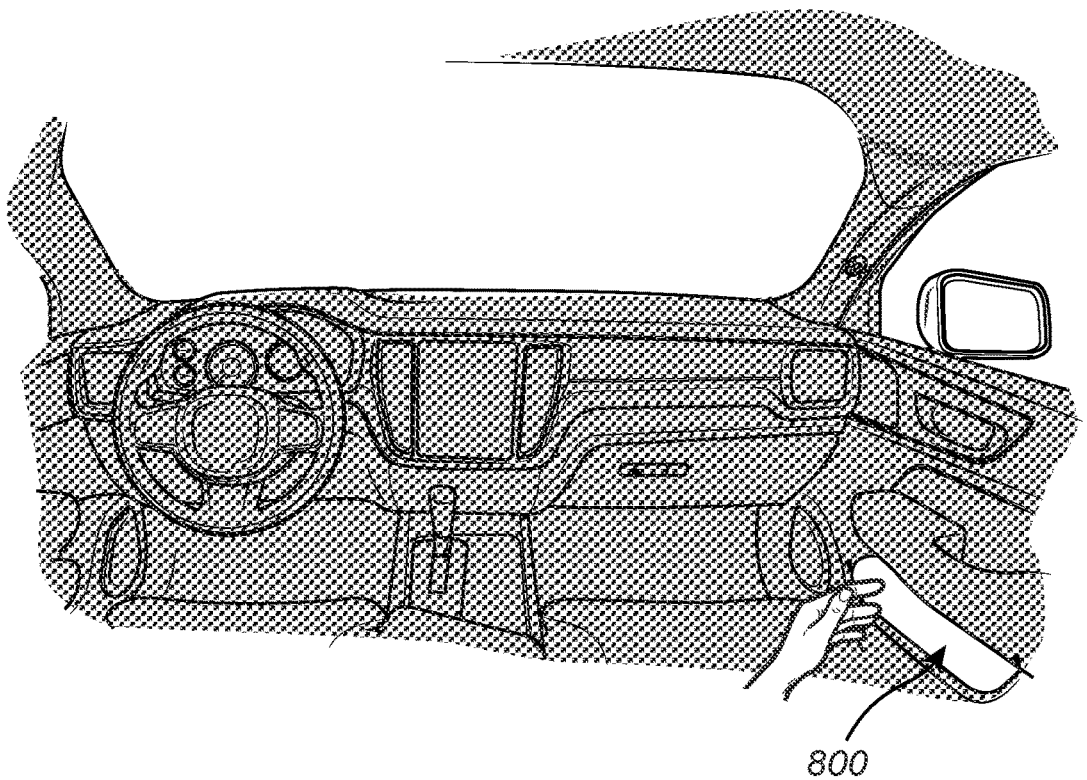

FIG. 8A-B illustrates another example user scenario. In FIG. 8A a user is situated in the passenger seat next to a door stowage 800, e.g. a compartment where a user may store items. A lighting device (not shown) is arranged to illuminate the door stowage 800 with a diffuse light. In FIG. 8B, the user reaches for the door stowage 800. This is detected by sensors such as proximity sensors arranged near the door stowage 800. The sensors provide sensing signals to the control unit shown in FIG. 6. In response the light output is transformed to a higher contrast light output picture illuminating the door stowage 800. Note that the door stowage may here be replaced by any vehicle interior component that the user may reach for, such as glove compartment, infotainment systems, centre consoles, air vents, etc. Accordingly, the light device 100 is responsive to transform the output light based on a detected user scenario, wherein a user scenario is related to that the user is interacting with a component 800 in the vehicle interior space that the lighting device is adapted to illuminate.

In one aspect of the present disclosure, there is further provided a lighting system configured to emit transformable output light, including: a first optical output module including optical elements configured to redirect incoming light to produce diffuse light and a second optical output module including optical elements configured to redirect incoming light to produce light with higher contrast than the diffuse light produced by the first optical output module, and a light source assembly configured to transmit light of one of increasing and decreasing intensity to the first optical output module, and to transmit light of the other one of increasing and decreasing intensity to the second optical output module, such that the contrast of the output light is transformed.

According to a further aspect, there is provided a computer program product including a computer readable medium having stored thereon computer program means for controlling a light source assembly configured to transmit light to a lighting device including at least two optical output modules, wherein a first optical output module includes optical elements configured redirect incoming light to produce diffuse light and a second optical output module including optical elements configured redirect incoming light to produce light with higher contrast than the diffuse light emitted from the first optical output module, wherein the computer program product includes: code for detecting a user scenario; and code for, in response to the detected user scenario, control the light source assembly to transmit light of one of increasing and decreasing intensity to the first optical output module, and to transmit light of the other one of increasing and decreasing intensity to the second optical output module.

There is further provided a vehicle including a lighting system.

There is further provided a light source assembly configured to transmit incoming light to a lighting device including at least two optical output modules, wherein a first optical output module includes optical elements configured to redirect incoming light to produce diffuse light and a second optical output module configured to redirect incoming light to produce light with higher contrast than the diffuse light produced by the first optical output module, wherein the light source assembly is responsive to a control signal to transmit incoming light of one of increasing and decreasing intensity to the first optical output module, and to transmit incoming light of the other one of increasing and decreasing intensity to the second optical output module.

The control signal may be generated in response to a detected user scenario.

The light source assembly may include a first light source arranged to transmit incoming light to the first optical output module and second light source arranged to simultaneously transmit incoming light to the second optical output module.

The light source assemblies may include any known light sources suitable for the specific implementations, as long as the intensity of the emitted light is adjustable. Example light sources include light-emitting diodes (LEDs) and halogen light sources. LEDs are the preferred light source type.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. Any reference signs in the claims should not be construed as limiting the scope.

Various examples have been described. These and other examples are within the scope of the following claims.

The invention claimed is:

1. A lighting device adapted to illuminate a vehicle interior space, comprising
    at least two optical output modules for jointly providing transformable output light, wherein a first optical output module comprises optical elements configured to redirect incoming light to produce diffuse light, and a second optical output module comprises optical elements configured to redirect incoming light to produce light with higher contrast than the diffuse light produced by the first optical output module, wherein
    the first optical output module and the second optical output module are arranged to receive incoming light from a light source assembly in such a way that when the first optical output module receives incoming light of one of gradually increasing and gradually decreasing intensity, the second optical output module receives incoming light of the other one of gradually increasing and gradually decreasing intensity such that the contrast of the output light from the lighting device is gradually transformed from one of a diffuse light output and a light output with higher contrast than the diffuse light to the other one of a diffuse light output and a light output with higher contrast than the diffuse light, wherein
    the lighting device is responsive to transform the output light based on a detected user scenario based on detected usage or intended usage of vehicle interior components or based on a present state of the vehicle.

2. The lighting device according to claim 1, wherein the optical elements are optical prisms.

3. The lighting device according to claim 2, wherein the prisms of the first optical output module are different from the set of prisms of the second optical output module.

4. The lighting device according to claim 1, wherein the first optical output module and the second optical output module are light guides, wherein the optical elements are arranged to redirect light through a respective light guide.

5. The lighting device according to claim 4, wherein the optical elements are arranged in side by side along the respective light guide to provide a substantially homogenous light output from the respective light guide.

6. The lighting device according to claim 1, wherein the optical output modules are elongated and arranged side by side.

7. The lighting device according to claim 6, wherein the optical output modules are attached to each other and oriented in parallel with each other.

8. The lighting device according to claim 1, wherein the light device is responsive to transform the output light based on a detected user scenario, wherein a user scenario is related to that the user is interacting with a component in the vehicle interior space.

9. The lighting device according to claim 1, wherein the vehicle interior space is a sub-space of the entire vehicle interior space.

10. A light source assembly configured to transmit incoming light to a lighting device comprising at least two optical output modules, wherein a first optical output module comprises optical elements configured to redirect incoming light to produce diffuse light and a second optical output module configured to redirect incoming light to produce light with higher contrast than the diffuse light produced by the first optical output module, wherein
    the light source assembly is responsive to a control signal to transmit incoming light of one of gradually increasing and gradually decreasing intensity to the first optical output module, and to transmit incoming light of the other one of gradually increasing and gradually decreasing intensity to the second optical output module, such that the contrast of the output light from the lighting device is gradually transformed from one of a diffuse light output and a light output with higher contrast than the diffuse light to the other one of a diffuse light output and a light output with higher contrast than the diffuse light, wherein
    the light source assembly is responsive to transform the output light based on a detected user scenario based on detected usage or intended usage of vehicle interior components or based on a present state of a vehicle.

11. The light source assembly according to claim 10, comprising a first light source arranged to transmit incoming light to the first optical output module and second light source arranged to simultaneously transmit incoming light to the second optical output module.

12. A control unit configured to control a light source assembly configured to transmit light to a lighting device comprising at least two optical output modules,
   wherein a first optical output module comprises optical elements configured to redirect incoming light to produce diffuse light and a second optical output module configured to redirect incoming light to produce light with higher contrast than the diffuse light emitted from the first optical output module,
   wherein the control unit is configured to control the light source assembly to transmit incoming light of one of gradually increasing and gradually decreasing intensity to the first optical output module, and to transmit incoming light of the other one of gradually increasing and gradually decreasing intensity to the second optical output module, such that the contrast of the output light from the lighting device is gradually transformed from one of a diffuse light output and a light output with higher contrast than the diffuse light to the other one of a diffuse light output and a light output with higher contrast than the diffuse light, wherein
   the control unit is responsive to transform the output light based on a detected user scenario based on detected usage or intended usage of vehicle interior components or based on a present state of a vehicle.

13. A lighting system configured to emit transformable output light, comprising:
   a first optical output module comprising optical elements configured to redirect incoming light to produce diffuse light, and a second optical output module comprising optical elements configured to redirect incoming light to produce light with higher contrast than the diffuse light produced by the first optical output module, and
   a light source assembly configured to transmit incoming light of one of gradually increasing and gradually decreasing intensity to the first optical output module, and to transmit incoming light of the other one of gradually increasing and gradually decreasing intensity to the second optical output module, such that the contrast of the output light is transformed from one of a diffuse light output and a light output with higher contrast than the diffuse light to the other one of a diffuse light output and a light output with higher contrast than the diffuse light, wherein
   the lighting system is responsive to transform the output light based on a detected user scenario based on detected usage or intended usage of vehicle interior components or based on a present state of a vehicle.

14. A vehicle comprising a lighting system according to claim 13.

15. A computer program product comprising a computer readable medium having stored thereon computer program means for controlling a light source assembly configured to transmit light to a lighting device comprising at least two optical output modules, wherein a first optical output module comprises optical elements configured to redirect incoming light to produce diffuse light, and a second optical output module comprising optical elements configured to redirect incoming light to produce light with higher contrast than the diffuse light produced by the first optical output module, wherein the computer program product comprises:
   code for detecting a user scenario;
   code for, in response to the detected user scenario, control the light source assembly to transmit incoming light of one of gradually increasing and gradually decreasing intensity to the first optical output module, and to transmit incoming light of the other one of gradually increasing and gradually decreasing intensity to the second optical output module, such that the contrast of the output light from the lighting device is gradually transformed from one of a diffuse light output and a light output with higher contrast than the diffuse light to the other one of a diffuse light output and a light output with higher contrast than the diffuse light, and
   code for controlling a transformation of the output light based on a detected user scenario based on detected usage or intended usage of vehicle interior components or based on a present state of a vehicle.

* * * * *